J. B. Webb,
Automatic Gate,
Nº 65,519.           Patented June 4, 1867.
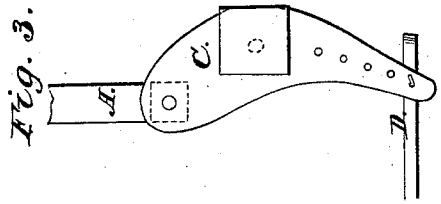
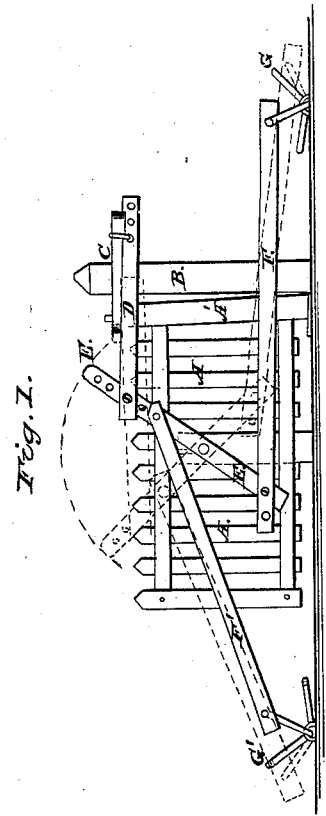
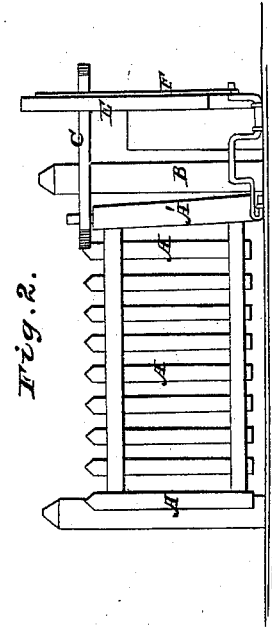
Witnesses:
Lawrence Murphy
Chas. F. Clausen
Inventor.
J. B. Webb
by D. F. Holloway & Co.
his Atty

United States Patent Office.

JAMES B. WEBB, OF MUSCATINE, IOWA.

Letters Patent No. 65,519, dated June 4, 1867.

FARM-GATE.

The Schedule referred to in these Letters Patent and making part of the same.

TO ALL WHOM IT MAY CONCERN:

Be it known that I, JAMES B. WEBB, of Muscatine, in the county of Muscatine, and State of Iowa, have invented a new and useful improvement in Automatic Gates; and I do hereby declare that the following is a full, clear, and exact description of the same, reference being had to the accompanying drawings, making part of this specification, in which—

Figure 1 is a side elevation, showing the gate open.
Figure 2 is a side elevation, showing the gate closed.
Figure 3 is a plan of the shifting head-piece.

The same letters in all the figures indicate the same parts.

A is the gate which crosses the road-way, being hung from the post B. The end-bar A' rests upon a toe within a socket, turning freely The upper end thereof has a projecting journal passing through a shifting head-piece, C, which is a lever turning upon a bearing in the post B, (shown in fig. 3.) The shifting head-piece C is connected adjustably with the connecting-rod D by a pin or link. The rod D is horizontal, and extends in a direction parallel with the line of the road-way, and is adjustably connected by a pin with the lever E, which is vertical, and pivoted to a post so as to move freely when moved by the rods F and F', one of which is attached by a pin above the pivot, and the other in like manner an equal distance from and below the pivot. The rods F and F' are respectively attached on opposite sides of the gate to the double cranks G and G'. These cranks are fastened to blocks set in the track of the road-way on each side of the fence, and they are at such distance from the gate that a vehicle passing through the gate may be driven over either of the loops of the crank, one of which will be turned up as the other is turned down, thereby causing the arm of the crank to which the rods F and F' are attached to oscillate from or towards the gate. Supposing the gate to be closed, a vehicle approaching it from either side must be so directed that the wheels shall pass over the loop of the crank-rod, which is vertical; it will be pushed down, turning the arm to which the rod F or F' is attached. The motion of this rod will shift the lever E, and through the action of the connecting-rod D turn the shifting head-piece C, thereby throwing the end-piece A from its vertical position, lifting the gate-latch from the catch, and causing such an inclination of the gate that its gravity will cause it to open, and thus remain until the vehicle, in the same manner, after passing through the gate, shall be driven over the rod G or G' on the other side, thereby securing the action of all the connecting parts, and causing the gate in like manner to swing by its own gravity so as to close and secure its latch in its normal position.

What I claim as my improvement, and desire to secure by Letters Patent, is—

The combination of the gate A, post B, adjustable head-piece C, with the rods and levers D, E, F, and F', and double crank-rods G and G', arranged to operate substantially in the manner and for the purpose set forth.

In testimony whereof I have signed my name to this specification in the presence of two subscribing witnesses.

JAMES B. WEBB.

Witnesses:
J. SCOTT RICHMAN,
D. C. RICHMAN.